April 16, 1957  J. W. NEEDLES  2,788,575
ARTICULATOR

Filed July 27, 1953  3 Sheets-Sheet 1

INVENTOR.
JOHN W. NEEDLES
BY Edward B. Fogg
ATTORNEY

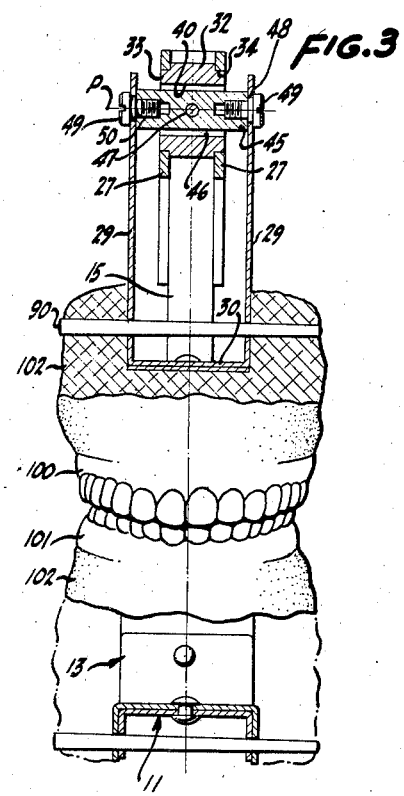

April 16, 1957 J. W. NEEDLES 2,788,575
ARTICULATOR
Filed July 27, 1953. 3 Sheets-Sheet 3

INVENTOR.
JOHN W. NEEDLES
BY Edward B. Fogg
ATTORNEY

United States Patent Office 2,788,575
Patented Apr. 16, 1957

2,788,575

ARTICULATOR

John W. Needles, Glendale, Calif.

Application July 27, 1953, Serial No. 370,295

6 Claims. (Cl. 32—32)

This invention relates to a dental articulator.

In that branch of dentistry known as prosthodontia, use is frequently made of an instrument known as an articulator. The purpose of an articulator is to provide a mechanical device simulating in some degree or other the various movements of the lower mandible and of the teeth. To be fully operative for this purpose an articulator requires a hinge axis to simulate the opening and closing movements of the jaw and it also requires a universal joint to simulate the protrusive (and corresponding retractive) movements of the teeth, the lateral movements which are employed during mastication and resultant or compound movements. The protrusive and lateral movement are components of what is called the spherical movement of the teeth.

In my prior Patent No. 1,368,408, granted February 15, 1921, entitled "Articulator," there is described and claimed a device of this character which has found extensive use in the dental profession.

A difficulty in my prior articulator described in the aforesaid patent, and in other articulators which have been developed since, is that the manipulation and adjustments thereof require a high degree of skill and considerable experience. Also, many prior articulators lack certain desirable features of flexibility and others are relatively large and bulky.

It is an object of the present invention to provide an improved form of dental articulator.

It is another object of the invention to provide an articulator having certain novel and advantageous features of adjustment which render it more truly reproductive of the movements of the human jaw.

A further object of the invention is to provide an articulator which is more easily susceptible of use by a dentist or dental assistant who lacks the high degree of skill which has been required heretofore for the successful use of previous articulators.

These and other objects of the invention will be apparent from the ensuing description and the appended claims.

One form of the invention is illustrated by way of example in the accompanying drawings, in which Figure 1 is a view in side elevation of the articulator of the invention.

Figure 3 is a staggered section taken along the line 3—3 of Figure 1.

Figure 4 is a section taken along the line 4—4 of Figure 2 showing the incisal guide assembly in detail.

Figure 5 is a section taken along the line 5—5 of Figure 1 showing the lower part of the incisal guide assembly in top plan view.

Figure 6 is a section taken along the line 6—6 of Figure 1 showing the hinge axis in detail.

Figure 2:
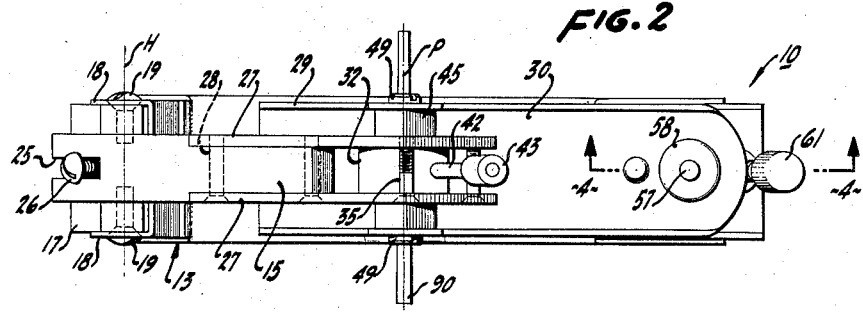
Figure 2 is a top plan view thereof as seen from above Figure 1.
Figure 1:
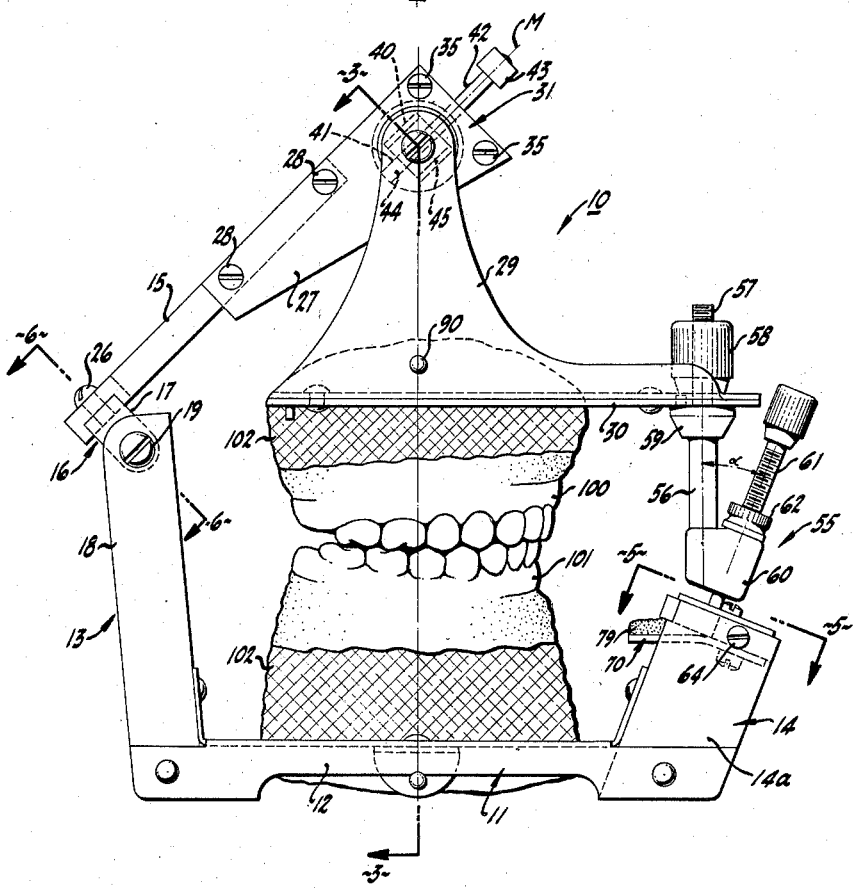

Referring now to the drawings and more particularly to Figure 1, the articulator is generally designated by the reference numeral 10. It comprises a stationary frame 11 which comprises a main or lower base 12, a rear column 13 and a front column 14. An arm 15 is provided having a hinge axis 16 which is also shown in Figures 2 and 6. The hinge axis 16 comprises a block 17 which is pivotally connected to the lateral wings 18 of the column 13 by means of screws 19. The block 17 is recessed at 20 to slidably receive the arm 15 and the latter is formed with a slot 25 to receive a screw 26 which is threaded into the block 17. It will be apparent that the hinge axis 16 enables the arm 15 to swing about a horizontal axis H (i. e., the axis passing through the screws 19) and that the effective length of the arm 15 is adjustable by reason of the slot 25.

At its forward end the arm 15 is fixed to side plates 27 by means of screws 28. Arms 29 and an upper base plate 30 which is fixed to the lower ends of the arms 30, are suspended from the outer end of the arm 15. The suspension is in the form of a universal joint, as will be explained, and is generally designated by the reference numeral 31.

As is best shown in Figures 2 and 3, a cylindrical block 32 having shoulders 33 at opposite ends fits within circular holes 34 formed in the side plates 27. The cylindrical block 32 may be rotated about its axis and may be clamped in position by means of the plates 27 and screws 35 (see also Figure 1). The block 32 has a rectangular hole 40 extending therethrough in an axial direction and it is also formed with a transverse hole 41 to receive a pin 42 having a head 43 and a threaded end 44 for reception in the innermost, threaded portion of the hole 41. Within the rectangular hole 40 is seated a rectangular shaft 45 one of whose transverse dimensions is such as to provide a clearance, as shown at 46, on opposite sides of the shaft to allow a limited degree of rotation about the axis of the pin 42. This axis is designated as M. The other transverse dimension of the shaft 45 is such as to provide a snug fit of the shaft 45 in the block 32 and to prevent rotation of the shaft except about the axis M. The inclination of the axis M is adjustable by means of the pin 42, which passes through a transverse hole 47 formed in the shaft 45. By rotating the pin 42, the block 32 and shaft 45 are rotated. Rotation of the arms 29 and of the upper base plate 30 about the axis of the shaft 45 is provided by a gimbal mounting of the arms 29. This axis is designated as P. As is best shown in Figure 3, the upper ends of the arms 30 are formed with holes 48 to receive screws 49 which are threaded into axial holes 50 formed in the ends of the shaft 45.

It will be apparent that a universal joint is provided which allows rotation of the upper base plate 31 about two intersecting, mutually perpendicular axes; i. e., about the axes M and P. The plane of these axes can be tilted by rotating the block 32, so as to assume any position from substantially horizontal to substantially vertical. The block 32 is held in adjusted position by frictional engagement with the plates 27. Rotation of the plane of the axes M and P is, however, without effect on the axis P; only the axis M is rotated. For convenience the point of intersection of the axes M and P, which is the center of spherical movement as explained more fully hereinafter, will be referred to sometimes as "O."

The articulator also comprises an incisal guide assembly which is generally designated by the numeral 55 and which is best shown in Figures 1, 4 and 5. The incisal guide assembly 55 comprises a rod 56 having a threaded upper end 57 which extends through a hole in the upper base plate 30 and which is clamped in position by means of a nut 58 and a shoulder 59. At its lower end the rod 56 is formed with a bracket 60 through which is threaded an incisal pin 61 which forms an angle $\alpha$ of 25° with the rod 56. The pin 61 is adjustable by reason of its threaded engagement with the bracket 60, and it is clamped in adjusted position by means of a nut 62. The lower portion of the incisal pin is preferably smooth and has a rounded lower end.

The incisal guide assembly 55 also comprises a block 63 which is fixed to the wings 14a of the front column 14 by means of screws 64. The block 63 is formed at its inner end with a U-shaped recess 65 to expose and provide access to an incisal plate 70 which has a horizontal portion 71 in registry with the recess 65 and a slanting portion 72. The slanting portion 72 is fixed to the block 63 by means of an open-ended slot 73 and a screw 73a. The upper surface of the block 63 is formed with a groove 74 which is an arc of a circle. Two butterfly wing plates 75 are provided, each having a detent 76 which is located in and is guided by the groove 74. Each of the plates 75 is also formed with an arcuate slot 77 to receive a screw 78 which is threaded into the block 63. Also shown in Figures 4 and 5 is a quantity of low melting alloy 79 for a purpose which is explained hereinafter. The horizontal portion 71 of the plate 70 is formed with holes 80 into which the alloy congeals and which therefore serves to key the alloy 79 to the plate 70.

Figure 9:
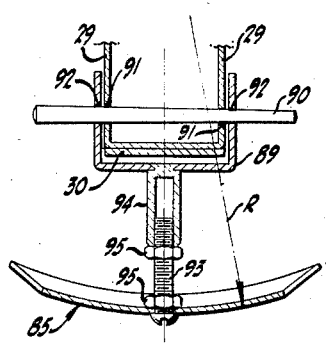
Figure 9 is a section taken along the line 9—9 of Figure 8 showing the jig in cross section.
Figure 7:
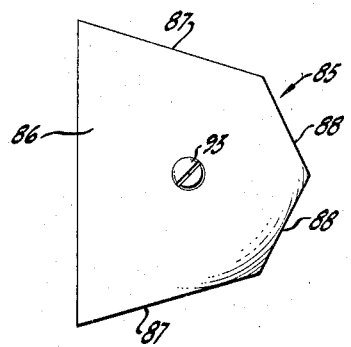
Figure 7 is a bottom view of the jig or gauge used to mount casts of dentures correctly in the articulator of my invention.

In Figures 7 and 9 there is shown a jig or gauge which is generally designated as 85. The jig 85 comprises a template 86 having forwardly and inwardly tapering sides 87 which taper at a steeper angle at 88 to provide a contour generally resembling that of the dental arch. As will be seen the template 86 is concavo-convex and it is, in fact, a segment of the surface of a sphere of radius R, the significance of which will be explained hereinafter. The jig 85 also comprises a bifurcated bracket or yoke 89 which is attachable to the arms 29 by a tapered pin 90 which extends through holes 91 and 92 formed in the arms 29 and in the yoke 89, respectively. A screw 93 extends through the template 86 and is threaded into a tubular member 94 fixed to the yoke. Nuts 95 are provided for locking the screw 93 and the template 86 in adjusted position.

Also shown in Figures 1 and 3 are casts 100 and 101 of upper and lower dentures, respectively. The casts 100 and 101 are secured by plaster mountings 102 to the upper plate 30 and the lower base 12, respectively. The casts 100 and 101 may be made by any suitable technique, and they may be casts of actual dentures of a patient which are mounted in the articulator for study to determine flaws in occlusion, etc., or they may be casts of artificial dentures prepared for a patient which are mounted in the articulator for study to determine whether they are correct for a particular patient.

For an individual patient there are certain fixed reference points or axes for the functioning of the dentures. Thus there is the hinge axis about which the lower dentures rotate in a simple opening and closing movement; there is also an axis for protrusion and retraction of the teeth; and there are multiple axes for lateral movement and intermediate movements such as occur during mastication. In accordance with the spherical theory of articulation, the protrusive-retractive axis (corresponding to the axis P of my articulator), the axis of lateral movement (corresponding to the axis M of my articulator) and all the intermediate axes (corresponding to simultaneous movements about both P and M) lie in a single plane which is defined by the axes M and P. Mechanically these movements can be reproduced by means of a universal joint.

In the articulator of my invention all these axes are provided and certain advantageous features are incorporated in the mechanical means for providing such axes and performing the respective movements. The hinge axis H is preferably fixed, as shown, and the universal joint 29 (i. e., the center of spherical movement) can be adjusted relatively to the hinge axis H by reason of the slot 25 and screw 26 (see Figure 6). The angle of the axis M of lateral movement can be adjusted by rotating the block 32 by means of the rod 42, and it is held in adjusted position by frictional engagement with the plates 27.

The incisal pin 61 is at an angle $\alpha$ of 25° with the vertical, and this pin is tangent to the arc of opening at its point of contact with the lower end of the incisal pin 61.

The jig or gauge 85, as will be apparent, is adjustable vertically. However, this is not essential. The template 86 has a curvature equal to that of the well known curve of Spee. This curvature varies, of course, from one individual to another, but an average curvature is sufficient. The amount of arc of lateral movement of the teeth is so small that the differences of radius and curvature among different individuals can be neglected.

Figure 8:
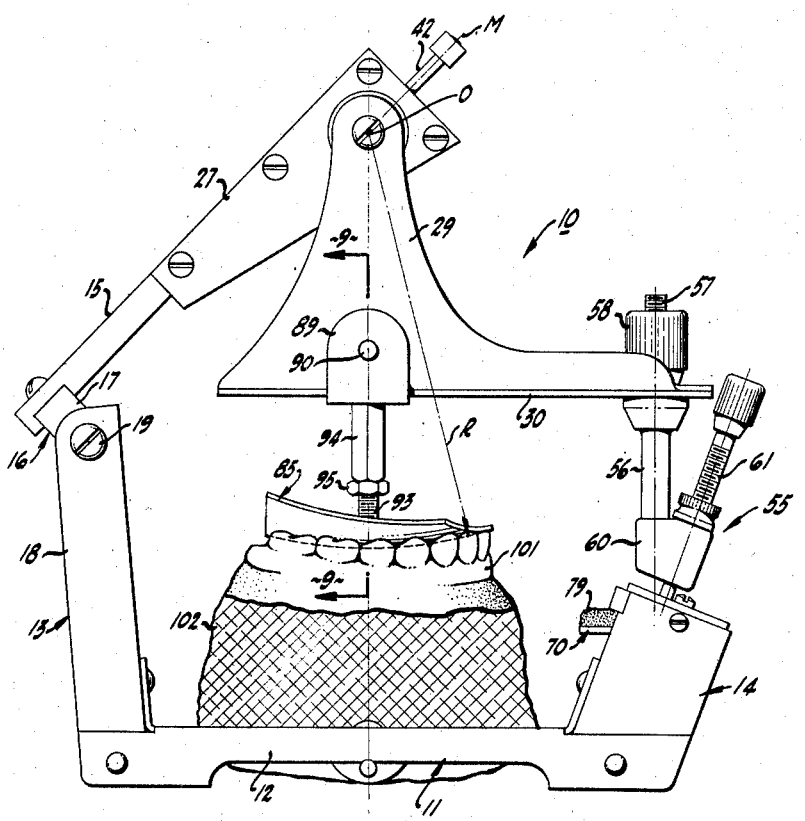
Figure 8 is a view in side elevation of the articulator similar to Figure 1 but showing the jig of Figure 7 mounted thereon.

Referring to Figure 8 the center of the curve of Spee is the point of intersection of the axes M and P; i. e., it is the center O of the universal joint 31. The screw 93 is adjusted to locate the template 86 at the proper radius with respect to the center of the universal joint 29. As explained, however, this vertical adjustment is not necessary. The incisal pin 61 will be adjusted to hold the plate 31 in horizontal position. The template 86 will then be in proper position; i. e., it will occupy a curved surface corresponding to and coinciding with the spherical surface of occlusion of the dentures. The lower cast 101 is then mounted so that, except for variations caused by tooth cusps, it lies on the under surface of the template 86. The jig 85 is then removed and the upper cast 100 is mounted so as to occlude properly with the lower cast. The casts will then be in the proper occlusal relation.

The dentures are now in proper position for the opening and closing movement, and they are also in proper position for protrusive-retractive movement, for lateral movement and for intermediate movements except for variations caused by tooth cusps. This factor is provided for by means of the alloy 79, which will be given a configuration such that, when the incisal pin is moved over it, the surface of the alloy will constitute in effect a projection of the cusp configuration. By moving the incisal pin 61 in contact with the edges of the plate 75, the proper lateral or masticating movement will be imparted to the casts and by moving the incisal pin backwards and forwards the proper protrusive-retractive movement will be imparted to the casts.

It will thus be apparent that an articulator has been provided which satisfies the several objects mentioned hereinabove and which has numerous advantageous features, among which may be mentioned the following:

In general the construction is simplified. The articulator may be of smaller size than many articulators used heretofore, and many of the adjustments required in prior articulators are either eliminated or simplified. The articulator may be constructed for certain average dimensions and average geometry of the human mouth and of the tempero-mandibular joint. Error due to minor variations of individuals from such average dimensions and geometry will, for the most part, be exceeded by innate variations caused by resiliency of the tissues of the mouth.

The articulator of the present invention eliminates the necessity of using a face bow. By the use of the jig 85 and of a suitable bite technique such as that described in my co-pending application Serial No. 371,301, filed July 30, 1953, entitled Bite Recorder, the casts or dentures are located properly in relation to the hinge axis and the universal joint or center of the spherical movement without the necessity of using a face bow. The center of the circular groove 74 coincides with the axis of the incisal pins 61; hence rotation of the plates 75 cannot produce a scissors or binding effect which will impede movement of the incisal pin 61.

The pitching of the forward column 14 at an angle of 25° causes it to be tangent to the arc of opening movement; hence causes the plates 75 to be perpendicular to the incisal pin and radial with respect to the arc of opening movement.

The provision of a fusible metal alloy at 79, or an alternative wherein a stock of plates 70 are provided each having a typical surface, provides a means of reproducing, in projected form, the individual cusp form of a patient's dentures. This imparts accurate movement to the incisal guide pin. The sliding contact of the incisal guide pin 61 on the edges of the plates 75 controls the extent and direction of the spherical component of movement of the dentures (i. e., the protrusive-retractive movement about axis P and the lateral movement about axis M). Meanwhile contact of the end of the incisal pin with the fusible metal alloy 79, or with the surface of a stock plate where one is used instead of an alloy, controls the amount of opening and closing movement associated with the spherical movement, such associated movement being caused by the cusp form of the dentures.

The adjustability of the plane of the axes M and P of the universal joint controls the relation of the cast or dentures on the balancing side while the incisal pin controls the relation of the casts or dentures on the working side. Such control of two fixed points assures maintenance of the correct relation between the casts or dentures during mandibular movement.

Longitudinal adjustment of the universal joint 31 by means of the slot 25 and screw 26 provides a means for shifting the stress on the dentures toward the front or the back. This permits relief of pressure at the condyle in arthritis of this joint and it also provides a "rocking chair" fit of the dentures.

The gimbal mounting of the universal joint 31 permits rotation of the plane of the axes of this joint, which in turn controls the amount of Bennett movement, which is a lateral thrust at the condyles. The concentricity of the center of the universal joint and the gimbal mounting of the joint (i. e., the concentricity of the point of intersection of the axes M and P and the axis of block 32) permits rotation of the plane of the universal joint without altering the relation of the casts.

A further advantageous feature is the provision of tapered dowel pins as shown at 90 to retain the plaster at 102. This facilitates mounting and removal of the casts. Yet another advantageous feature is the easy accessibility of the incisal plate 70 which can be rotated on the axis of screws 64 to a convenient position. Plate 70 may be removed completely by loosening the screw 73a, to permit casting fusible metal 79 or to permit substitution of a stock plate.

I claim:

1. A dental articulator comprising a frame, a denture mounting member, means connecting said mounting member to said frame including a universal joint permitting protrusive-retractive movement, lateral movement and intermediate movements of the denture, and means for adjusting the plane of the axes of said universal joint, said means being effective to rotate the axis of lateral movement without altering the position of the axis of protrusive-retractive movement.

2. A dental articulator comprising a base, an arm pivotally mounted on the base for movement about a hinge axis to simulate the opening and closing movement of dentures, denture mounting means for mounting a denture and a universal joint connecting said denture mounting means to said arm, said universal joint including a block rotatable in the arm about a protrusion axis parallel to said hinge axis, means frictionally holding said block in any position to which it is rotated, and a shaft carried by said block concentric therewith and rockable about a lateral axis perpendicular to and in the plane of said protrusion axis, said denture mounting means being mounted on said shaft for rotation about said protrusion axis and for rocking with said shaft about said lateral axis.

3. In a mechanical articulator for simulating the movement of dentures, the improvement which comprises means for mounting a cast of one of a pair of dentures to allow rotation thereof about hinge, protrusion and lateral axes corresponding to the opening and closing, the protrusive-retractive and the lateral movements of natural dentures; said articulator also comprising means for imparting to said cast movements resulting from the cusp form of the dentures, said means comprising a guide plate having a configuration constituting a projection of the cusp form of dentures, and a follower member fixed to the cast and adapted to move over the surface of said plate.

4. In a mechanical articulator for simulating the movements of the dentures, the improvement which comprises means for mounting a cast of one of a pair of dentures to allow rotation about hinge, protrusion and lateral axes corresponding to the opening and closing, the protrusive-retractive and the lateral movements of natural dentures; said articulator also comprising means for imparting to said cast movements resulting from the cusp form of the dentures, said means comprising a guide plate having a fusible metal surface having a configuration constituting a projection of the cusp form of the dentures, and a follower member fixed to the cast and adapted to move over said fusible metal surface.

5. A dental articulator comprising a frame having a base portion for mounting the cast of a lower denture, an arm mounted at one end on the frame to swing about a horizontal hinge axis corresponding to the opening and closing movements of the dentures, means including a universal joint for mounting the cast of an upper denture on the other end of said arm, said universal joint permitting spherical movement of the upper denture in spherical occlusion with the lower denture, and an incisal guide assembly comprising an incisal guide plate having a surface lying generally in a horizontal plane but constituting a projection of the cusp form of the dentures, and an incisal guide member fixed in relation to and moving with the upper cast, pitched at an angle to be tangent to the arc of opening and closing movement and having an end portion capable of contacting, moving on and being guided by said incisal guide plate.

6. In a mechanical articulator for simulating the movements of the dentures, the improvement which comprises means for mounting a cast of one of a pair of dentures to allow rotation about hinge, protrusion and lateral axes corresponding to the opening and closing, the protrusive-retractive and the lateral movements of natural dentures; said articulator also comprising means for imparting to said cast movements resulting from the cusp form of the dentures, said means comprising a follower member fixed to said cast and adapted to move over a guide surface, and a guide plate having a surface constituting a projection of a typical cusp form.

References Cited in the file of this patent

UNITED STATES PATENTS

| | | |
|---|---|---|
| 565,326 | Bragg | Aug. 4, 1896 |
| 2,200,058 | Chott | May 7, 1940 |
| 2,644,233 | Shmukler et al. | July 3, 1953 |